3,083,158
ANTI-SLUDGING AGENTS
Wendell G. Markham, Downey, Calif., assignor to Petrolite Corporation, Wilmington, Del., a corporation of Delaware
No Drawing. Filed Aug. 20, 1959, Ser. No. 834,951
21 Claims. (Cl. 252—8.55)

This invention relates to the art or procedure commonly referred to as the acidization of oil-bearing strata which comprises introducing an acid into an oil well for the purpose of causing the acid to disintegrate, dissolve, or react with the oil-bearing structure of the well, in a manner which results in an increase in the amount of crude petroleum obtained from the oil-bearing strata. More particularly, this invention relates to compositions useful in preventing the formation of acid sludge during such acidization, and to the use of said compositions in acidizing oil-bearing strata.

The acidization of oil-bearing strata is a well known method of increasing oil production. The main constituent of such acid treating compositions is an acid, usually hydrochloric acid. This treating fluid, sometimes known as oil well acid, usually contains a demulsifier, a corrosion inhibitor, a surfactant, and various other agents required for a specific reaction on the oil-bearing strata. For example, in strata which are predominantly sandstone, hydrofluoric acid, fluorides, boric acid, etc., are also constituents of the acid treating composition. Although commercial hydrochloric acid is available at a concentration of 31.5 to 37 percent by weight, concentrated acid is generally diluted with water to 15 percent for most acidizing jobs. However, acid varying in strength from about 5 to about 30 percent HCl has been employed in the preparation of oil well acid.

In general, the composition of the oil-bearing strata and the bottom hole temperature are the chief factors which influence the selection of all additives except the demulsifier. Selection of the demulsifier is generally dependent upon the crude oil itself. Although many crude oils when mixed with acid will form emulsions if no demulsifier is present, small amounts of a properly selected demulsifier in the acid will effect demulsification of the acid from the crude oil within a short time.

Another factor which is a cause of ineffective acidizing is the formation of acid sludge. Most people do not recognize this factor, since they believe acid sludge and acid-in-oil emulsions to be the same thing. However, it cannot be overemphasized that acid sludge and emulsification are two separate and distinct phenomena. Acid sludge often occurs where no emulsions are formed or where a demulsifier is present to assist in the separation of two liquid phases. An acid sludge consists of tiny solid dark particles which settle to the bottom of the oil layer at the interface above the acid layer. Often it may be observed visually as a wafer after the supernatant crude oil has been poured off. In a well this acid sludge clogs the pores of the formation and thus diminishes the flow of oil to the well bore. The technique of stimulating oil production by the acidization of some oil-bearing zones in California has often been avoided or discontinued where the formation of acid sludge with hydrochloric acid poses a severe problem.

I have observed that acids such as sulfuric, hydrochloric, nitric, trichloroacetic, etc., form acid sludges when intimately mixed with some, but not all, crude oils at room temperature or above. The amount and properties of the sludge formed is dependent upon variables such as: temperature, acid-to-oil ratio, degree of mixing, acid normality, degree of ionization, reaction time, and the zone or strata from which the oil is obtained. Acid sludge may be recognized as the viscous layer which separates oil from acid after all the acid has separated from the oil upon standing a few hours after mixing. Often the sludge layer can be separated from the oil and the acid in the form of a wafer. The wafer, when dried, appears to consist of loosely consolidated solid particles of asphaltenes which are completely soluble in carbon disulfide. Since acid sludge is composed primarily of solids, it is not an emulsion, although an emulsion may contain particles of acid sludge.

The mechanism of acid sludge formation is not understood. However, I have tested crudes from several states including California, Colorado, Wyoming, and abroad, for example Iran, and have found a sufficient amount of acid sludge formed to severely damage a formation by clogging subsequent to acidization. Acid sludge is not formed in all acid jobs. Samples of crude oil from various locations were tested to see if they all formed an acid sludge upon being intimately mixed with an equal volume of 15 percent HCl at room temperature, then allowed to settle at 140° F. Many crudes formed no acid sludge when tested in this manner. Some formed acid sludge which varied from 0 to 16 percent of the oil volume. It was observed that crude oils from different zones, in the same field, have different sludging characteristics as shown in Table I below.

TABLE I

*Acid Sludge Tests With Seal Beach and Inglewood Crudes*

INGLEWOOD, CALIFORNIA, FIELD

| ° API | Zone | Production Interval [1] | Acid Sludge (Vol. percent of crude) |
|---|---|---|---|
| 15.2 | Investment | 799–1,643 | None |
| 21.8 | Vickers | 1,300–2,645 | None |
| 28.7 | Rindge | 2,551–3,210 | 2 |
| 28 | Rubel | 3,256–3,460 and 3,819–3,948 | 3 |
| 23.8 | Moynier | 4,482–5,476 | 3 |
| 36.3 | Sentous | 8,124–3,823 | 4 |

SEAL BEACH, CALIFORNIA, FIELD

| ° API | Zone | Production Interval [1] | Acid Sludge (Vol. percent of crude) |
|---|---|---|---|
| 23.3 | San Gabriel | 4,505 | None |
| 25.6 | Wasem | 5,760 | None |
| 29.4 | Selover | 6,470 | None |
| 30 | McGrath | 9,300 | 16 |
| 21 | Lane | 10,283 | None |

[1] Depth at bottom of zone.

I have now discovered that compounds of the formula R—X prevent the forming of acid sludge during the acidization of oil wells, where R contains at least about 6 carbon atoms, for example, 6 to 24 carbons, but preferably 12–18 carbons and the —X radical contains a functional group, for example, an alcohol group, a carbonyl group, for example aldehydic or ketonic group, an oxyalkylene or polyoxyalkylene group, an ester group, a sulfur ester such as sulfuric, sulfate or sulfate esters and their salts, an acid salt group including cations which are inorganic or organic, a halide group, a nitrile group, or an ether group. In general, these compounds are oil soluble and are relatively insoluble in aqueous acid solutions. Ordinarily, the activity of these compounds increases with increasing carbon chain length. For example, where the chain length increases from 8 to 16 carbons or more, the sludge preventing activity of the compound also increases. In practice, the process of this invention comprises using these compounds in conjunction with acidizing compositions heretofore employed.

Examples of the R include the following groups: alkyl, cycloalkyl, alkenyl, alkynyl, and the like. Preferably R contains a fatty type hydrocarbon group. Although many isomeric configurations of the R group can be employed, it is preferred that R be as unbranched as possible and most preferably straight chained.

The functional groups described by X can also vary widely. Thus, they can be an hydroxyl —OH group; an ester group

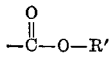

wherein R' is alkyl, alkenyl, or alkynyl; a carbonyl group

or

wherein R' is alkyl, alkenyl, or alkynyl; an oxyalkylene group such as —(O—R')$_x$—OH wherein R' is a hydrocarbon radical; an acid salt group

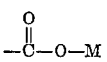

wherein M is a metal cation, for example, Na, K, Ca, etc.; a halide group wherein X is —Br, —Cl, or —F, etc.; a nitrile group wherein X is —C—N; an ether group —O—R' wherein R' is a hydrocarbon radical; an ester, for example, a sulfate ester

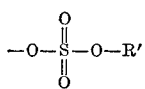

a sulfate ester salt

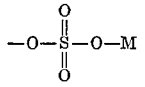

sulfuric ester salts, and the like.

In practice, an anti-sludging additive should have the following desirable properties. The additive should:

(1) Effectively prevent the formation of acid sludge in crude oil over a wide acid concentration, for example from 5 to 30 percent by weight of HCl.

(2) Require a small amount of reagent.

(3) Be easily dissolved, dispersed, suspended, or emulsified in the acid.

(4) Be stable in acid for many hours at 200° F.

(5) Not be detrimental to the activity of other ingredients present in the acid.

(6) Be unaffected by spent acid or a 20 percent calcium chloride solution.

(7) Be so economical to employ that the additive can be used in the formulation of all oil well acid without the need of testing every crude oil for its sludge-forming characteristics.

The compounds of this invention fulfil all of the above requirements except that they are not easily dissolved or dispersed in the acidizing medium. Although they are effective anti-sludging agents when dissolved in oil, they cannot be effectively employed unless they can be transported to the oil in the formation where they can fulfil this function. Since these compounds are substantially insoluble in the acidizing medium they must be emulsified in the acid by means of a suitable emulsifying agent that will not stabilize acid-in-oil emulsions which could be formed in the strata from which the oil is derived.

I have discovered a composition which fulfils all of the above requirements. In essence, this composition comprises an emulsion, suspension, or dispersion of said compounds in the acidizing medium. Any suitable method of effecting such an emulsion, suspension, or dispersion can be employed. However, I have discovered an effective composition capable of being facilely emulsified in the acidizing medium which comprises:

(1) RX compound.

(2) A suitable emulsifier. A coupling agent, for example, a 3 to 10 carbon monohydroxy alcohol may also be employed if desired.

A suitable emulsifier for this invention is one which will, on one hand enable the insoluble RX compound to be emulsified in acid, and on the other hand break emulsions formed of the acid-in-oil type. Although there are hundreds of surface active agents which have been used as both emulsifiers and demulsifiers, there are only a limited number of chemical materials which will accomplish this dual objective in the present system. It is readily understandable why most ordinary demulsifiers for preventing the formation of water-in-oil type emulsions are ineffective. Ordinary demulsifiers either are not soluble in half-strength (15%) hydrochloric acid, or its equivalent, or they are not soluble in spent brine which is roughly equivalent to 20 percent calcium chloride and having a pH of 3.5 to 5. Furthermore, if soluble at all, they are generally decomposed. If they do not decompose under ordinary conditions, they at least decompose under the conditions of pressure and temperature encountered during acidization. Examples of emulsifiers suitable for the purpose of this invention are best described by referring to one or more of the following patents:

U.S. Patent No. 2,470,829, dated May 24, 1949
U.S. Patent No. 2,470,830, dated May 24, 1949
U.S. Patent No. 2,499,370, dated Mar. 7, 1950
U.S. Patent No. 2,589,195, dated Mar. 11, 1952
U.S. Patent No. 2,589,196, dated Mar. 11, 1952
U.S. Patent No. 2,589,197, dated Mar. 11, 1952
U.S. Patent No. 2,589,198, dated Mar. 11, 1952
U.S. Patent No. 2,589,199, dated Mar. 11, 1952

A preferred type of emulsifier suitable for the purpose of this invention is described in U.S. Patent No. 2,499,370. It is an emulsifier comprised of a hydrophile oxyalkylated 2,4,6, $C_4$ to $C_{12}$ hydrocarbon substituted monocyclic phenol $C_1$ to $C_8$ aldehyde resin in which the ratio of oxyalkylene groups to phenolic nuclei is at least 2:1 and the alkylene radicals of the oxyalkylene groups, for example, ethylene, propylene, butylene, hydroxypropylene, and hydroxybutylene radicals. In simple terms the emulsifier is an oxyalkylated phenol-formaldehyde resin.

I have prepared compositions which are very useful for the prevention of acid sludge during the acidization of oil bearing strata. The following is an example of such a composition which is easily emulsified in the oil well acid:

|  | General Range, Percent by Volume | Preferable Range, Percent by Volume |
| --- | --- | --- |
| Sludge preventive | 80 to 99 | 90 to 96 |
| Emulsifier | 1 to 20 | 4 to 10 |

From an economy-effectiveness point of view, I have found the following compositions very satisfactory:

Percent
(1) R—X _____ 95
where R is $C_{12}$ to $C_{18}$.
(2) Emulsifier _____ 5

As an example of a preferred emulsifier I use an oxyalkylated phenol-formaldehyde resin, comprising the octyl phenol aldehyde resin in which there are six moles of ethylene oxide added as the hydrophile.

No acid sludge is formed when the compositions are used in the acidizing of wells in low concentrations, for example, 0.05 to 5% or higher, but preferably 1–2% based on volume of active reagent to volume of oil well acid employed. For example, I advantageously employed one or two ml. of sludge preventive mixture per 100 ml. of oil well acid, where the mixture is at least 50% active.

As an example of the activity of compounds or mixtures used as an acid sludge preventive, the following laboratory anti-sludge test is presented:

Fifty ml. of 15% HCl or oil well acid are placed in a 4-oz. sample bottle. To this acid is added one ml. of anti-sludge material. The bottle is shaken thoroughly to insure complete mixing. Finally 50 ml. of a crude oil (known to form a sludge on contact with acid) is added, after which the bottle is closed and agitated by shaking for five minutes in a shaking machine at the rate of 130 oscillations per minute. The bottle is then removed and allowed to stand in a water bath for 16 hours at 140° F. and after this time separation of oil, acid, and sludge is complete. The oil layer can be poured off carefully from the underlying acid sludge layer or wafer if it is present. If there is only a small amount of sludge present in the oil layer, it may be observed as the residue which remains on a 4" by 4" piece of window screen through which the oil is poured for disposal. The relative volume of sludge may be compared with sludge from a comparable sample to which no sludge preventive was added. This comparison serves as an index of the effectiveness of a chemical in the prevention of sludge.

The compounds shown in Table II as such and as emulsions when tested according to the above procedure gave excellent anti-sludging results.

TABLE II

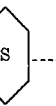

| Ex. | Compound | R-Group | X-Radical |
|---|---|---|---|
| 1 | Octyl alcohol | $CH_3(CH_2)_7$— | —OH |
| 2 | Nonylcyclohexanol | $CH_3(CH_2)_8$—⌬—S— | —OH |
| 3 | Methyl Palmitate | $CH_3(CH_2)_{15}$— | —O—C(=O)—O—CH$_3$ |
| 4 | Ethyl octyl ketone | $CH_3(CH_2)_7$— | —O—C(=O)—CH$_2$—CH$_3$ |
| 5 | Octyl "Cellosolve" | $CH_3(CH_2)_7$— | —O(CH$_2$)$_2$—OH |
| 6 | Potassium oleate | $CH_3(CH_2)_7CH:CH(CH_2)_7$— | —O—C(=O)—K |
| 7 | Chloro-octane | $CH_3(CH_2)_7$— | —Cl |
| 8 | Decyl chlorosulfonate | $CH_3(CH_2)_9$— | —O—S(=O)$_2$—Cl |
| 9 | The sodium sulfate ester salt of oleic acid | $CH_3(CH_2)_7CH:CH(CH_2)_7$— | —O—S(=O)$_2$—O—Na |
| 10 | Ethyl cetyl ether | $CH_3(CH_2)_{15}$— | —O—CH$_2$—CH$_3$ |
| 11 | Lauronitrile | $CH_3(CH_2)_{10}$— | —CN |

The above RX compounds are effective in emulsified form in the general, preferred and optimum ranges of RX-emulsifier ratios stated above. Compositions containing emulsifiers formed by adding six moles of ethylene oxide to an octyl phenol-formaldehyde resin (see Ex. 8a, U.S. Patent 2,499,470), and used in about 5% volume concentration in 95% of the RX compounds of Table II are employed.

In summary, I have found that RX compounds prevent acid sludge and that a superior reagent can be prepared by admixing RX compounds with a suitable emulsifying agent. In general, this reagent contains one to 20%, but preferably 4 to 10% of an emulsifier.

The emulsifying agents employed should be capable of emulsifying these RX compounds in the oil well acid without stabilizing oil-acid emulsion. The preferred class of emulsifiers are oxyalkylated phenol formaldehyde resins. The preferred species of these resins is described in U.S. Patent No. 2,499,370, Example 8a.

In view of the fact that acidization procedures and the use of other agents such as demulsifiers in acidizing procedures is so well known, there is no need to go into a discussion of acidizing procedures and other acidizing additives. For the sake of brevity, reference is made to the following patents which give a cross-sectional view of the art related to acidization, although there are in addition certain other practical elements which are well known and described in B. M. Kingston: "Acidizing Handbook," Gulf Publishing Company, Houston, Texas, 1947. The following United States patents are pertinent to the art of acidization of oil wells and the composition of materials used for this purpose:

| | |
|---|---|
| 1,877,504 | 2,233,383 |
| 1,891,667 | 2,232,931 |
| 1,911,446 | 2,251,393 |
| 2,011,579 | 2,262,737–742 |
| 2,024,718 | 2,278,838 |
| 2,038,956 | 2,663,689 |
| 2,053,285 | 2,290,417–417 |
| 2,125,429 | 2,290,419 |
| 2,128,161 | 2,292,208 |
| 2,128,601 | 2,300,393 |
| 2,161,085 | 2,370,421 |
| 2,175,081 | 2,400,395 |
| 2,175,095 | 2,824,834 |

The essence of the present invention is that the composition herein disclosed and claimed are useful when employed as the sole additive in acidizing processes or in conjunction with other acidizing additives, for example, in any of the processes disclosed in the above patents.

Having thus described my invention, what I claim as new and desire to secure by Letters Patent is:

1. A composition of matter useful in preventing formation of acid sludge during acidization of an oil-bearing strata which consists essentially, in the acid medium, of an emulsion of
   (A) an anti-sludging amount of a compound selected from the group consisting of
      I. an aliphatic alcohol of the formula ROH wherein R is an alkyl group having at least 6 carbon atoms,
      II. an aliphatic alcohol of the formula ROH wherein R is an alkenyl group having at least 6 carbon atoms, III. an aliphatic alcohol of the formula ROH wherein R is an alkynyl group having at least 6 carbon atoms, IV. a cycloaliphatic alcohol of the formula $$R\!-\!\!\left[\!-\!S\!-\!\right]\!\!-\!OH$$

wherein R is a hydrocarbon having at least 6 carbon atoms,

V. an ester of an aliphatic fatty acid having the formula $$R-\overset{O}{\underset{\|}{C}}-O-R'$$

wherein R is a hydrocarbon group having at least 6 carbon atoms and R' is a hydrocarbon group having at least 1 carbon atom, VI. a salt of an aliphatic fatty acid having the formula $$R-\overset{O}{\underset{\|}{C}}-O-M$$

wherein R is a hydrocarbon group having at least 6 carbon atoms and M is an alkali metal, VII. a salt of an aliphatic fatty acid having the formula $$R-\overset{O}{\underset{\|}{C}}-O-M$$

wherein R is a hydrocarbon group having at least 6 carbon atoms and M is an alkaline earth metal, VIII. an aliphatic ketone of the formula $$R-\overset{O}{\underset{\|}{C}}-R'$$

wherein R is a hydrocarbon group having at least 6 carbon atoms and R' is a hydrocarbon group having at least one carbon, IX. an aliphatic aldehyde of the formula $$R-\overset{O}{\underset{\|}{C}}-H$$

wherein R is a hydrocarbon group having at least 6 carbon atoms,

X. an aliphatic ether alcohol of the formula $ROCH_2CH_2OH$ wherein R is a hydrocarbon group having at least 6 carbon atoms, XI. an aliphatic halosulfonate of the formula $$R-O-\overset{O}{\underset{\underset{O}{\|}}{\overset{\|}{S}}}-Hal$$

wherein R is a hydrocarbon group having at least 6 carbon atoms and Hal is a halide group, XII. an alkali metal salt of sulfated oleic acid, XIII. an alkaline earth metal salt of sulfated oleic acid, XIV. an aliphatic ether of the formula ROR' wherein R is a hydrocarbon group having at least 6 carbon atoms and R' is a hydrocarbon group having at least one carbon atom, XV. an aliphatic nitrile of the formula RCN wherein R is a hydrocarbon group having at least 6 carbon atoms, XVI. an aliphatic halide of the formula RHal wherein R is a hydrocarbon group having at least 6 carbon atoms and Hal is a halide group, and (B) an emulsifier selected from the group consisting of I. a reagent comprising an acylated derivative of a basic aminoalcohol of the formula:

$$H(OR')_nN\!\!\diagup\!\!\overset{R''}{\underset{R''}{\diagdown}}$$

said derivatives thereof being such that there is at least one occurrence of the radical RCO, which is the acyl radical of a monocarboxy detergent-forming acid having at least 8 and not more than 32 carbon atoms; the amino nitrogen atom is basic; R'' is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxy alkylene radicals, hydroxy alkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; n is a small whole number varying from 1 to 10; RCO being a substituent for a hydroxyl hydrogen atom; and the molecular weight of said compound in monomeric form is at least 213 and not over 4,000; said amino compound being selected from the class consisting of the anhydro base, the hydrated base, and salts;

II. a hydrophile oxyalkylated 2,4,6 $C_4$–$C_{12}$-hydrocarbon substituted monocyclic phenol $C_1$–$C_8$-aldehyde resin in which the ratio of oxyalkylene groups to phenolic nuclei is at least 2:1, the alkylene radical of the oxyalkylene group being a radical selected from the group consisting of ethylene, propylene, butylene, hydroxypropylene, and hydroxybutylene radicals;

III. a mixture of I, II, and a blown fatty body selected from the group consisting of blown fatty oils and blown fatty acids, the proportions of I, II, and said blown fatty body, respectively, constituting not less than 10% each of the total active matter of said mixture;

IV. a mixture of I, II, (a) a blown fatty body selected from the group consisting of blown fatty oils and blown fatty acids, and (b) a sulfonated fatty body selected from the group consisting of sulfonated fatty oils and sulfonated fatty acids substantially neutral to methyl orange indicator, the proportions of I, II, (a) and (b), respectively, constituting not less than 10% each of the total active matter of said mixture;

V. a reagent comprising a substituted imidazoline selected from the group consisting of

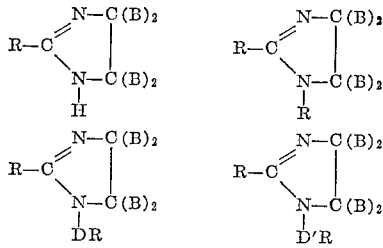

in which B represents at least one member selected from the class consisting of hydrogen and low molal alkyl radicals having less than 8 carbon atoms; D represents a divalent, nonamino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms;

VI. a reaction product produced by the reaction between a poly-halogenated non-ionized organic compound in which the halogen atoms are not directly attached to an aromatic ring and a surface-active condensation polymer of mean molecular weight not in excess of 2,000, which latter is in turn obtained by the heat-polymerization of a tertiary aminoalcohol of the formula:

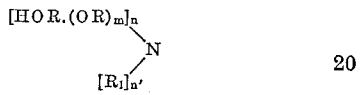

in which formula, OR is an alkylene oxide radical having not more than 4 carbon atoms and selected from the class consisting of ethylene oxide radicals, propylene oxide radicals, butylene oxide radicals, glycide radicals, and methylglycide radicals; $R_1$ is a non-aromatic hydrocarbon radical having 6 carbon atoms or less; $m$ represents a number varying from 0 to 3; $n$ represents the numeral 1, 2, or 3; and $n'$ represents the numeral 0, 1, or 2, with the proviso that $n+n'=3$; said reaction resulting in the conversion, per molecule of polyhalogenated reactant, of not more than one halogen atom from the co-valent to the electro-valent state, whereby said compound (A) is emulsified in the acid medium without stabilizing oil-acid emulsions.

2. The composition of claim 1 wherein compound (A) is octanol.
3. The composition of claim 1 wherein compound (A) is nonylcyclohexanol.
4. The composition of claim 1 wherein compound (A) is methyl palmitate.
5. The composition of claim 1 wherein compound (A) is ethyl octyl ketone.
6. The composition of claim 1 wherein compound (A) is $CH_3(CH_2)_7OCH_2CH_2OH$.
7. The composition of claim 1 wherein compound (A) is decyl chlorosulfonate.
8. The composition of claim 1 wherein compound (A) is the sodium sulfate ester salt of oleic acid.
9. The composition of claim 1 wherein compound (A) is ethyl cetyl ether.
10. The composition of claim 1 wherein compound (A) is lauronitrile.
11. The composition of claim 1 wherein the anti-sludging amount of compound (A) ranges from 80–99%, by volume, of the composition and the amount of compound (B) ranges from 20–1%, by volume, of the composition.
12. A process of preventing the formation of acid sludge resulting from the acidization of oil-bearing strata which is characterized by introducing into said strata during acidization a composition of matter useful in preventing formation of said acid sludge during said acidization of said strata, said composition consisting essentially, in the acid medium, of an emulsion of (A) an anti-sludging amount of a compound selected from the group consisting of I. an aliphatic alcohol of the formula ROH wherein R is an alkyl group having at least 6 carbon atoms, II. an aliphatic alcohol of the formula ROH wherein R is an alkenyl group having at least 6 carbon atoms, III. an aliphatic alcohol of the formula ROH wherein R is an alkynyl group having at least 6 carbon atoms, IV. a cycloaliphatic alcohol of the formula

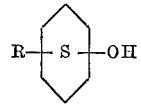

wherein R is a hydrocarbon having at least 6 carbon atoms,

V. an ester of an aliphatic fatty acid having the formula

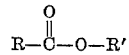

wherein R is a hydrocarbon group having at least 6 carbon atoms and R' is a hydrocarbon group having at least 1 carbon atom, VI. a salt of an aliphatic fatty acid having the formula

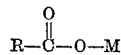

wherein R is a hydrocarbon group having at least 6 carbon atoms and M is an alkali metal.

VII. a salt of an aliphatic fatty acid having the formula

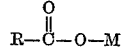

wherein R is a hydrocarbon group having at least 6 carbon atoms and M is an alkaline earth metal, VIII. an aliphatic ketone of the formula

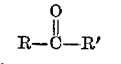

wherein R is a hydrocarbon group having at least 6 carbon atoms and R' is a hydrocarbon group having at least one carbon atom, IX. an aliphatic aldehyde of the formula

wherein R is a hydrocarbon group having at least 6 carbon atoms,

X. an aliphatic ether alcohol of the formula $ROCH_2CH_2OH$ wherein R is a hydrocarbon group having at least 6 carbon atoms, XI. an aliphatic halosulfonate of the formula

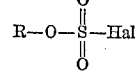

wherein R is a hydrocarbon group having at least 6 carbon atoms and Hal is a halide group, XII. an alkali metal salt of sulfated oleic acid,
XIII. an alkali earth metal salt of sulfated oleic acid,
XIV. an aliphatic ether of the formula ROR' wherein R is a hydrocarbon group having at least 6 carbon atoms and R' is a hydrocarbon group having at least one carbon atom,
XV. an aliphatic nitrile of the formula RCN wherein R is a hydrocarbon group having at least 6 carbon atoms,
XVI. an aliphatic halide of the formula RHal wherein R is a hydrocarbon group having at least 6 carbon atoms and Hal is a halide group, and (B) an emulsifier selected from the group consisting of I. a reagent comprising an acylated derivative of a basic aminoalcohol of the formula:

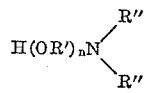

said derivatives thereof being such that there is at least one occurrence of the radical RCO, which is the acyl radical of a monocarboxy detergent-forming acid having at least 8 and not more than 32 carbon atoms; the amino nitrogen atom is basic; R" is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxy alkylene radicals, hydroxy alkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; $n$ is a small whole number varying from 1 to 10; RCO being a substituent for a hydroxyl hydrogen atom; and the molecular weight of said compound in monomeric form is at least 213 and not over 4,000; said amino compound being selected from the class consisting of the anhydro base, the hydrated base, and salts;

II. a hydrophile oxyalkylated 2,4,6 $C_4$–$C_{12}$-hydrocarbon substituted monocyclic phenol $C_1$–$C_8$-aldehyde resin in which the ratio of oxyalkylene groups to phenolic nuclei is at least 2:1, the alkylene radical of the oxyalkylene group being a radical selected from the group consisting of ethylene, propylene, butylene, hydroxypropylene, and hydroxybutylene radicals;

III. a mixture of I, II, and a blown fatty body selected from the group consisting of blown fatty oils and blown fatty acids, the proportions of I, II, and said blown fatty body, respectively, constituting not less than 10% each of the total active matter of said mixture;

IV. a mixture of I, II, (a) a blown fatty body selected from the group consisting of blown fatty oils and blown fatty acids, and (b) a sulfonated fatty body selected from the group consisting of sulfonated fatty oils and sulfonated fatty acids substantially neutral to methyl orange indicator, the proportions of I, II, (a) and (b), respectively, constituting not less than 10% each of the total active matter of said mixture;

V. a reagent comprising a substituted imidazoline selected from the group consisting of

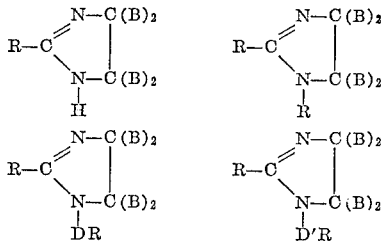

in which B represents at least one member selected from the class consisting of hydrogen and low molal alkyl radicals having less than 8 carbon atoms; D represents a divalent, nonamino, organic radical containing less than 25 carbon atoms and composed of elements selected from the group consisting of C, H, O, and N; D' represents a divalent, organic radical containing less than 25 carbon atoms and composed of elements selected from the class consisting of C, H, O, and N, and containing at least one amino group; and R is a member selected from the class consisting of hydrogen and aliphatic and cycloaliphatic hydrocarbon radicals; with the proviso that at least one occurrence of R contains from 8 to 32 carbon atoms;

VI. a reaction product produced by the reaction between a poly-halogenated non-ionized organic compound in which the halogen atoms are not directly attached to an aromatic ring and a surface-active condensation polymer of mean molecular weight not in excess of 2,000, which latter is in turn obtained by the heat-polymerization of a tertiary aminoalcohol of the formula:

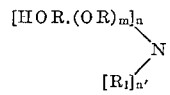

in which formula, OR is an alkylene oxide radical having not more than 4 carbon atoms and selected from the class consisting of ethylene oxide radicals, propylene oxide radicals, butylene oxide radicals, glycide radicals, and methylglycide radicals; $R_1$ is a non-aromatic hydrocarbon radical having 6 carbon atoms or less; $m$ represents a number varying from 0 to 3; $n$ represents the numeral 1, 2, or 3; and $n'$ represents the numeral 0, 1, or 2, with the proviso that $n+n'=3$; said reaction resulting in the conversion, per molecule of polyhalogenated reactant, of not more than one halogen atom from the co-valent to the electro-valent state, thereby emulsifying said compound (A) in the acid medium without stabilizing oil-acid emulsions.

13. The process of claim 12 wherein compound (A) is octanol.
14. The process of claim 12 wherein compound (A) is nonylcyclohexanol.
15. The process of claim 12 wherein compound (A) is methyl palmitate.
16. The process of claim 12 wherein compound (A) is ethyl octyl ketone.
17. The process of claim 12 wherein compound (A) is $CH_3(CH_2)_7OCH_2CH_2OH$.
18. The process of claim 12 wherein compound (A) is decyl chlorosulfonate.
19. The process of claim 12 wherein compound (A) is the sodium sulfate ester salt of oleic acid.
20. The process of claim 12 wherein compound (A) is ethyl cetyl ether.
21. The process of claim 12 wherein compound (A) is lauronitrile.

References Cited in the file of this patent

UNITED STATES PATENTS

| | | |
|---|---|---|
| 2,024,718 | Chamberlain | Dec. 17, 1935 |
| 2,125,429 | Denker | Aug. 2, 1938 |
| 2,128,161 | Morgan | Aug. 23, 1938 |
| 2,265,759 | Lawton et al. | Dec. 9, 1941 |
| 2,278,838 | De Groote et al. | Apr. 7, 1942 |
| 2,314,022 | Stone | Mar. 16, 1943 |
| 2,336,714 | Butler et al. | Dec. 14, 1943 |
| 2,338,282 | Flett | Jan. 4, 1944 |
| 2,717,876 | Menaul | Sept. 13, 1955 |
| 2,753,939 | Carpenter et al. | July 10, 1956 |
| 2,814,593 | Beiswanger et al. | Nov. 26, 1957 |